Patented Nov. 1, 1927.

1,647,676

UNITED STATES PATENT OFFICE.

EWALD VON RETZE, OF KONSTANZ BADEN, GERMANY, ASSIGNOR TO HOLZVERKOHLUNGS-INDUSTRIE, A. G., OF KONSTANZ BADEN, GERMANY.

PROCESS FOR THE PRODUCTION OF CONCENTRATED ACETIC ACID.

No Drawing. Application filed June 14, 1926, Serial No. 116,033, and in Germany June 17, 1925.

The conversion of dilute acetic acid, for instance, pyroligneous acid into concentrated acetic acid as operated at present comprises converting acetic acid into calcium acetate, for instance by treating the pyroligneous acid with lye and separating solid calcium acetate and decomposing calcium acetate by treatment with sulfuric acid to yield concentrated acetic acid.

In this process it is necessary to dry the calcium acetate by evaporating the acetate solution. This process requires an enormous amount of heat and involves certain technical difficulties. The process of this application necessitates a much smaller expenditure of heat. According to the present invention the dilute acetic acid is esterfied and the acetic acid is recovered in concentrated form by saponification of the esters.

It is an object of this invention to devise a continuous process for the preparation of concentrated acetic acid from dilute acetic acid.

It is another object of this invention to separate the acetic acid in the form of an ester from a dilute solution of acetic acid and to liberate the acetic acid in concentrated form from said ester.

It is another object of this invention to form pure esters from solutions of acetic acid.

While this invention is applicable to any solution of acetic acid and especially to dilute solutions of acetic acid, its major practical application is found in the preparation of concentrated acetic acid from pyroligneous acids.

The process, generally, comprises completely esterifying the acetic acid, separating the ester formed, hydrolyzing the ester with a limited quantity of water in the presence of a catalyst, such as a strong acid, separating the liberated alcohol and any undecomposed ester from the hydrolysis mixture and recovering concentrated acetic acid liberated by the hydrolysis.

The following examples are given as preferred manners of operating this process:

*Example 1.*—To pyroligneous acid is added an amount of methyl alcohol, which with the methyl alcohol present in the pyroligneous acid will be sufficient to convert the pyroligneous acid into the methyl esters thereof. This solution is then treated in the usual manner to esterify all the acids. The mixture of esters is then treated, for example, by simple rectification to separate the methyl acetate. The pure methyl acetate is then hydrolyzed with a limited amount of water. This hydrolysis may be materially aided by adding a strong acid, preferably sulfuric acid since the latter may be easily removed after the hydrolysis. After the hydrolysis the sulfuric acid is neutralized by means of lime or caustic soda, or sodium, or calcium acetate, and the mixture is then distilled. The distillate obtained contains the total quantity of unhydrolyzed ester and the alcohol resulting from the hydrolysis, together with some water. The acetic acid remains in the still and may be driven off by further distillation to obtain a higher concentration of pure acetic acid. The mixture of ester and alcohol formed is re-worked to separate the alcohol from the ester by any of the well known processes. The alcohol formed may be returned to the esterifying step and the ester to the hydrolyzing step.

*Example 2.*—On esterification of the pyroligneous acid as above is obtained a mixture of the esters of acetic acid and the esters of the homologues of acetic acid. The esters of these homologues may be separated, for example by rectification from the acetic acid ester and the acetic acid ester treated as in the previous processes. The esters of the homologues may be separated into pure products or hydrolyzed or converted into any manner into the desired products.

*Example 3.*—Instead of forming the methyl esters as in the previous processes, the methyl alcohol may be separated from the pyroligneous acid and the esterification carried on with ethyl alcohol or any other desired alcohol, and the esters thus formed treated as in the previous examples.

*Example 4.*—Another convenient method of operating comprising adding to the pyroligneous acid a quantity of ethyl alcohol which would be required to esterify all the acids. The quantity of alcohol employed depends on the concentration of the aqueous solution. As previously described a small amount of strong acid, for instance, sulfuric acid, may be added to aid in the esterification. On distillation an alcoholic ester mixture is obtained. From this mixture the alcohol is separated, either by treating the vapor of the mixture with water or treating the liquid alcohol-ester mixture with water. The alcohol is dissolved out by the water. If it is desired to separate out acetic acid esters from this ester mixture the ester mixture may be rectified to remove the esters other than the acetic acid esters. The acetic acid ester may then be hydrolyzed by refluxing the ester with a calculated amount of water in the presence of a small quantity of strong acid, for example, sulfuric acid, for several hours. The quantity of water required depends upon the acid concentrations desired. For example, if 88 parts of ester be treated with 18 parts of water, at the end of the hydrolysis a mixture containing 20 parts of acetic acid, 12 parts of water, 58.7 parts of ester, and 15.3 parts of ethyl alcohol is obtained. From this mixture acetic acid of 80–85 per cent strength can be obtained.

To produce an acetic acid of 50–55 percent strength, use is made of about 45 parts of water to 88 parts of ester. A mixture is then obtained consisting of 30 parts of acetic acid, 36 parts of water, 44 parts of ester, and 23 parts of alcohol, from which the 50–55 per cent acetic acid may be obtained. These hydrolysis mixtures are preferably distilled in such a manner that the esters and alcohol together with about 10 percent of their volume of water is vaporized. The resulting solution of acetic acid which remains in the still may be further distilled to yield a concentrated pure acetic acid. The ester alcohol distillate which is distilled off may be treated to separate the alcohol from the ester by treating either the ester alcohol vapor mixture with water, or treating the liquid ester alcohol mixture with water. The ester thus obtained may be subjected to further hydrolysis while the recovered alcohol is returned to the esterification step.

Instead of separating the acetic acid esters from the other esters, all of them may be hydrolyzed if this is desired.

The above description of my invention is not to be taken as limiting, but merely as descriptive of the best manner of utilizing my invention, which I claim to be:

1. A process for forming concentrated acetic acid which comprises esterifying a dilute solution of acetic acid, separating the ester formed, partially hydrolyzing the separated ester with a limited quantity of water, and separating the acetic acid formed from the undecomposed ester and liberated alcohol.

2. A process for forming concentrated acetic acid which comprises esterifying a dilute solution of acetic acid, separating the ester formed, partially hydrolyzing the separated ester with a limited quantity of water, and separating the undecomposed ester and liberated alcohol from the hydrolysis mixture, and separating the concentrated pure acetic acid from said mixture.

3. A process for forming concentrated acetic acid which comprises esterifying a dilute solution of acetic acid, separating the ester formed, partially hydrolyzing the separated ester with a limited quantity of water, distilling off the undecomposed ester and liberated alcohol from said hydrolysis mixture, and subsequently distilling off concentrated acetic acid.

4. A process for forming concentrated acetic acid which comprises esterifying a dilute mixture of acetic acid and its homologues, separating acetic acid ester formed from the esters of said homologues, partially hydrolyzing said acetic acid ester with a limited quantity of water, and separating the acetic acid formed from the undecomposed acetic acid ester and liberated alcohol.

5. A process for forming concentrated acetic acid which comprises esterifying a dilute mixture of acetic acid and its homologues, separating the thus formed acetic acid ester from the esters of said homologues, partially hydrolyzing said acetic acid ester with a limited quantity of water, separating the undecomposed acetic acid ester and liberated alcohol from the hydrolyzed mixture, and separating the concentrated pure acetic acid from said mixture.

6. A process for forming concentrated acetic acid which comprises esterifying a dilute mixture of acetic acid and its homologues, separating the thus formed acetic acid ester from the esters of said homologues, partially hydrolyzing said acetic acid ester with a limited quantity of water, distilling off the undecomposed ester and liberated alcohol from said hydrolysis mixture and subsequently distilling off concentrated acetic acid.

7. A process for forming concentrated acetic acid which comprises esterifying a dilute solution of acetic acid, separating the ester formed, partially hydrolyzing the separated ester with a limited quantity of water, separating the acetic acid formed from the undecomposed ester and liberated alcohol, separating the alcohol from the undecomposed ester and returning the acetic acid ester to the process.

8. A process for forming concentrated acetic acid which comprises adding alcohol to pyroligneous acid, treating said mixture to completely esterify all the acids present, separating acetic acid ester from the esters of the homologues of acetic acid present, partially hydrolyzing said acetic acid ester with a limited quantity of water, and separating the acetic acid formed from the undecomposed ester and liberated alcohol.

9. A process for forming concentrated acetic acid which comprises adding alcohol to pyroligneous acid, treating said mixture to completely esterify all the acids present, separating acetic acid ester from the esters of the homologues of acetic acid present, partially hydrolyzing said acetic acid ester with a limited quantity of water, separating the undecomposed ester and liberated alcohol from the hydrolysis mixture, and separating concentrated pure acetic acid from said mixture.

10. A process for forming concentrated acetic acid which comprises adding alcohol to pyroligneous acid, treating said mixture to completely esterify all the acids present, separating acetic acid ester from the esters of the homologues of acetic acid present, partially hydrolyzing said acetic acid ester with a limited quantity of water, distilling off the undecomposed ester and liberated alcohol from said hydrolysis mixture, and subsequently distilling off concentrated acetic acid.

11. A process for forming concentrated acetic acid which comprises adding alcohol to pyroligneous acid, treating said mixture to completely esterify all the acids present, separating acetic acid ester from the esters of the homologues of acetic acid present, partially hydrolyzing said acetic acid ester with a limited quantity of water, separating the acetic acid formed from the undecomposed ester and liberated alcohol, separating the alcohol from the undecomposed acetic acid ester and returning the acetic acid ester to the process.

12. A process for forming concentrated acetic acid which comprises separating the methyl alcohol from the pyroligneous acid, completely esterifying the acids in said pyroligneous acid, separating acetic acid ester from the esters of the homologues of acetic acid present, partially hydrolyzing said acetic acid ester with a limited quantity of water, and separating the acetic acid formed from the undecomposed ester and liberated alcohol.

13. A process for forming concentrated acetic acid which comprises separating the methyl alcohol from pyroligneous acid, adding ethyl alcohol and completely esterifying the acids in said pyroligneous acids with said ethyl alcohol, separating the ethyl acetate from the esters of the homologues of acetic acid present, partially hydrolyzing said ethyl acetate with a limited quantity of water, and separating the acetic acid from the undecomposed ethyl acetate and liberated alcohol.

14. A process for forming concentrated acetic acid which comprises separating the methyl alcohol from pyroligneous acid, adding ethyl alcohol and completely esterifying the acids in said pyroligneous acids with said ethyl alcohol, separating the ethyl acetate from the esters of the homologues of acetic acid present, partially hydrolyzing said ethyl acetate with a limited quantity of water, separating the undecomposed ester and liberated alcohol from the hydrolysis mixture, and separating concentrated pure acetic acid from said mixture.

15. A process for forming concentrated acetic acid which comprises separating the methyl alcohol from pyroligneous acid, adding ethyl alcohol and completely esterifying the acids in said pyroligneous acids with said ethyl alcohol, separating the ethyl acetate from the esters of the homologues of acetic acid present, partially hydrolyzing said ethyl acetate with a limited quantity of water, distilling off the undecomposed ester and liberated alcohol from said hydrolysis mixture, and subsequently distilling off concentrated acetic acid.

16. A process for forming concentrated acetic acid which comprises separating the methyl alcohol from pyroligneous acid, adding ethyl alcohol and completely esterifying the acids in said pyroligneous acids with said ethyl alcohol, separating the ethyl acetate from the esters of the homologues of acetic acid present, partially hydrolyzing said ethyl acetate with a limited quantity of water, separating the acetic acid from the undecomposed ethyl acetate and liberated alcohol, separating the alcohol from the undecomposed ethyl acetate and returning the acetic acid ester to the process.

17. A process for forming concentrated acetic acid which comprises esterifying a dilute mixture of acetic acid and its homologues, separating the thus formed acetic acid ester from the esters of said homologues, partially hydrolyzing said acetic acid ester with a limited quantity of water, separating the acetic acid formed from the undecomposed acetic acid ester and liberated alcohol, separating the alcohol from the undecomposed acetic acid ester and returning the acetic acid ester to the process.

In testimony whereof I affix my signature.

EWALD von RETZE.